UNITED STATES PATENT OFFICE.

BERNARD DESCAMP, OF BUFFALO, NEW YORK.

IMPROVEMENT IN THE MANUFACTURE OF STARCH.

Specification forming part of Letters Patent No. 44,405, dated September 27, 1864.

*To all whom it may concern:*

Be it known that I, BERNARD DESCAMP, of the city of Buffalo, in the county of Erie and State of New York, have invented a new and useful Improvement in the Process of Manufacturing Starch; and I do hereby declare that the following is a full and exact description of the same.

My improved process, when applied to obtaining starch from the cereals—such as corn, wheat, &c.—is conducted as follows: The grain is placed under ground in a close vessel, which may be of metal, though a tight wooden cask will answer every purpose. A cask of capacity sufficient to contain fifty bushels of corn is a convenient size. Being nearly filled and closed tightly, leaving a little space for the expansion of the contents, a steam-pipe is connected with it, and the grain is subjected to the action of steam at a low pressure for a period of twenty-four hours, or thereabout. The steam must be admitted moderately and only in sufficient quantity to raise the mass of grain to a temperature of a little below 200° Fahrenheit. Otherwise the heat will be so great as to cook some portions of the starch, and thereby spoil it. The steam is applied in such a quantity that the temperature of the grain, being lower, will condense a portion of it, and thereby furnish water which is absorbed and tends to soften the grain, while the temperature is raised to the effective point by the continued supply of steam. A little experience, with the aid of a thermometer, will enable the operator to proceed without danger to the product. Upon opening the cask the grain is found to be quite soft. It is then crushed between rollers in the usual manner, when water is added, and the mash is washed by passing it through sieves in the ordinary way and separating the floating bran from the surface of the water by skimming. A second and third washing, each time through finer sieves, leaves the pure starch in solution, which will be deposited at the bottom of the vat by standing undisturbed about twelve hours, and is ready by drawing off the water for removal to cloth for drying in the usual manner.

By my process no fermentation is employed, the glutinous matter of the grain being decomposed by the action of the steam alone, and the time reduced from three weeks to about thirty-six hours, on the average. No acetic acid is generated, as is done by the fermentative process, and consequently no alkali is required as a corrective or to complete the decomposition of the gluten. The result is that I obtain the starch of a better quality and purer color than by the old process, its tenacity or "strength" for laundry and similar purposes being considerably greater than when made by the old method. There is also a perceptible increase in quantity, no part being lost by conversion into acetic acid, as in the fermentative process, and the starch, from being entirely free from acid, keeps better and requires no alkaline admixtures, as it has much less tendency to fermentation than that article which has already been exposed to it from contact with more fermentative matters, which unavoidably leave some of their acid products behind them.

The saving of expense by this process is incalculably great. Wheat and other cereals require different degrees of steaming, generally for a less time than corn. The pressure of the steam need only be just sufficient to enable it to penetrate the pores of the mass, whether it be grain, flour, tubers, or the like, so that all parts are equally affected, which, with the time of exposure, may readily be determined by experiment.

The solution, after one washing, as described above, is in a suitable condition for converting the starch into sirup of sugar by the usual mode of treating with sulphuric acid.

What I claim as my invention, and desire to secure by Letters Patent, is—

The above-described process of separating starch from cereals and other materials by subjecting the same to the action of steam in closed vessels, substantially as set forth.

In witness whereof I have hereunto signed my name in the presence of two subscribing witnesses.

BERNARD DESCAMP.

Witnesses:
LYMAN P. PERKINS,
J. FRASER.